United States Patent
Kroos et al.

(10) Patent No.: US 7,597,078 B2
(45) Date of Patent: Oct. 6, 2009

(54) CAMSHAFT

(75) Inventors: Peter Kroos, Weil der Stadt (DE); Markus Lettmann, Pforzheim (DE); Falk Schneider, Korntal-Münchingen (DE)

(73) Assignee: Mahle International GmbH, Stuttgart (DE)

( * ) Notice: Subject to any disclaimer, the term of this patent is extended or adjusted under 35 U.S.C. 154(b) by 342 days.

(21) Appl. No.: 11/643,610

(22) Filed: Dec. 21, 2006

(65) Prior Publication Data
US 2007/0144469 A1 Jun. 28, 2007

(30) Foreign Application Priority Data
Dec. 24, 2005 (DE) .................. 10 2005 062 208

(51) Int. Cl.
*F01L 1/04* (2006.01)
(52) U.S. Cl. .................... 123/90.6; 123/90.16; 29/888.1
(58) Field of Classification Search ........... 123/90.6, 123/90.16, 90.27; 29/888.1; 74/567
See application file for complete search history.

(56) References Cited
U.S. PATENT DOCUMENTS
5,274,965 A * 1/1994 Jackson ......................... 52/11
5,611,228 A * 3/1997 Dummermuth ............. 72/21.2

FOREIGN PATENT DOCUMENTS
| DE | 39 43 426 C1 | 4/1991 |
| DE | 43 06 621 C2 | 9/1994 |
| EP | 1 362 986 A1 | 11/2003 |

* cited by examiner

Primary Examiner—Zelalem Eshete
(74) Attorney, Agent, or Firm—Collard & Roe, P.C.

(57) ABSTRACT

The present invention relates to a camshaft (1) having cams (3 and 4) rotatable with respect to one another about the camshaft axis (2) over limited circumferential angles, whereby an inside shaft (5) and an outside shaft (6) are arranged coaxially one inside the other. The cams (3 and 4) that are rotatable with respect to one another each consist of first cams (3) and second cams (4), whereby the first cams (3) are fixedly connected to the inside shaft (5) and the second cams (4) are fixedly connected to the outside shaft (6), each by means of a fixation device (8). It is essential to this invention that the first cams (3) each have a first through-bore (11) which is aligned with a respective second through-bore (12) in the inside shaft (5) when the first cam (3) is installed. In addition, the fixation device (8) is formed by two essentially identical fixation pins (10 and 10') with respect to their axial longitudinal extent. The present invention also relates to a method for manufacturing such a camshaft (1).

6 Claims, 2 Drawing Sheets

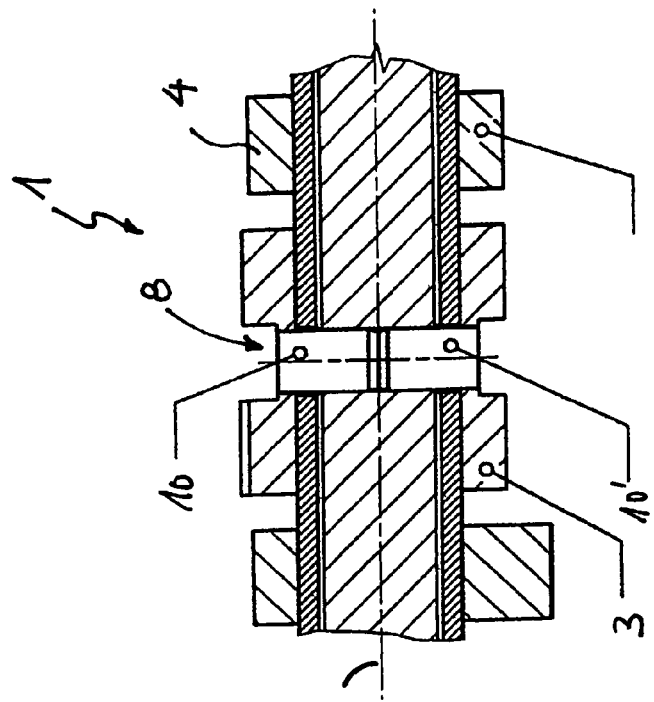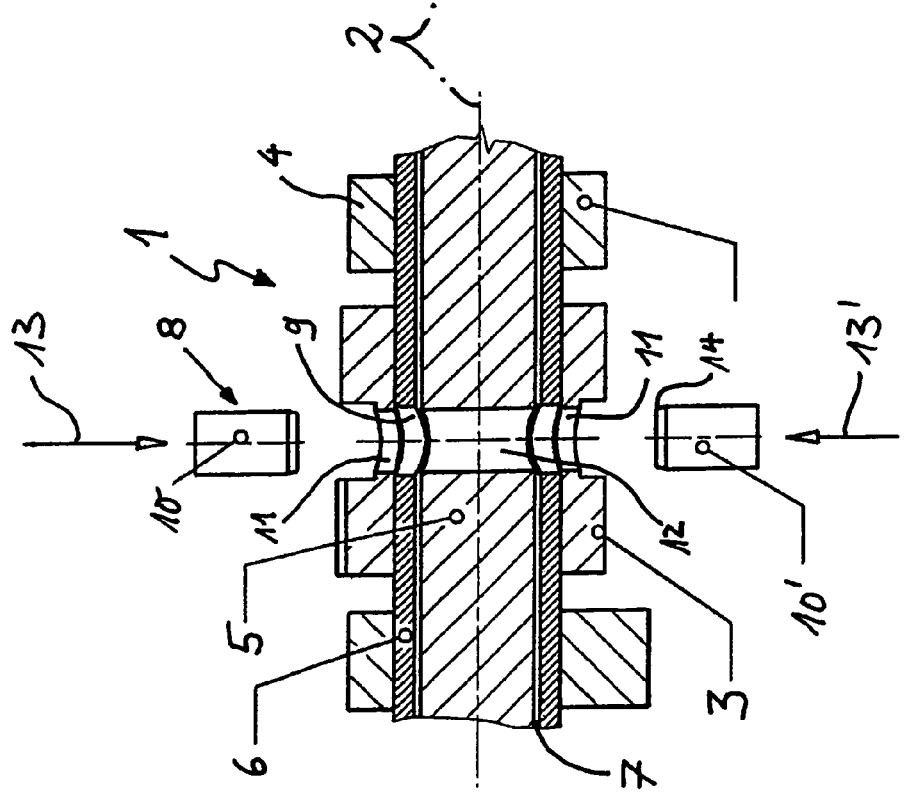

CAMSHAFT

CROSS REFERENCE TO RELATED APPLICATIONS

Figure 3:
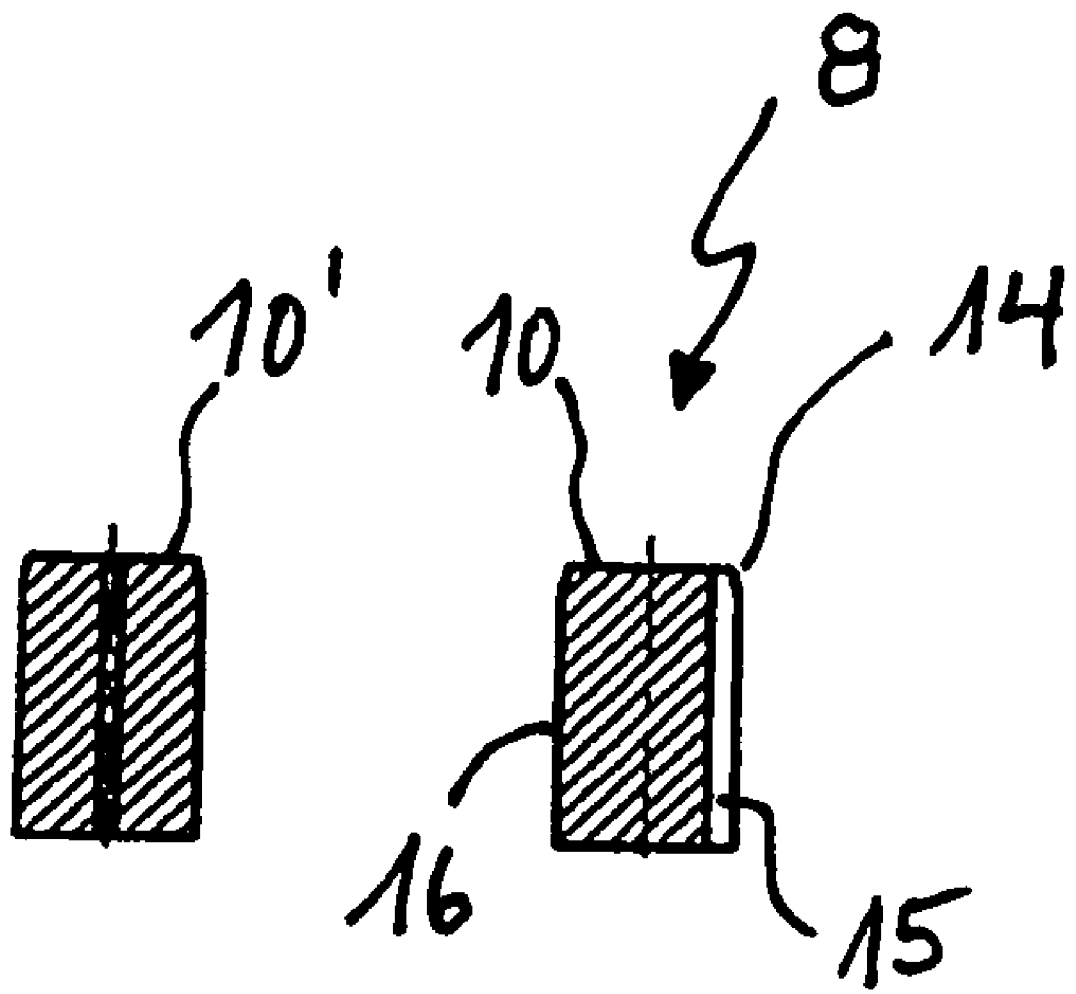

Applicants claim priority under 35 U.S.C. 119 of German Application No. 10 2005 062 208.9 filed Dec. 24, 2005.

The invention relates to a camshaft for automotive engines in particular having cams rotatable with respect to one another about the camshaft axis over limited circumferential angles according to the preamble of Patent Claim 1.

Such camshafts, which are known as adjustable and/or phase-adjustable camshafts, allow a change in the control times of the gas exchange valves of an internal combustion engine. The invention also relates to a method for manufacturing such a camshaft.

DE 39 43 426 C1 describes a camshaft having two shaft elements, one inside the other, each being adjustable with respect to the other, first cam elements being connected to the interior shaft element and second cam elements being connected to the exterior shaft element. It is provided here that the exterior shaft element has wall openings opposite one another, assigned to the cam elements of the interior shaft element, through which the first cam elements pass, with the pins connected to the interior shaft element. A bore is provided in the cam element as a blind hole extending into the cam elevation, the pin or pins being inserted and/or pressed into this blind hole in the same direction. In this embodiment, the insertion process may result in canceling the coaxial arrangement between the inside shaft and the outside shaft, thereby impairing the functionality of the camshaft.

DE 43 06 621 C2 describes a method for manufacturing a camshaft arrangement for valve-controlled internal combustion engines having two shaft elements, one inside the other, supported as an inside shaft in an outside shaft and rotatable about a limited angle in relation to one another. First cams, referred to as inside cams, in particular for intake valves are connected to the interior shaft element, and second cams, referred to as outside cams, are connected to the exterior shaft element, in particular for exhaust valves. Before assembly of the individual longitudinal sections to form the outside shaft, the cams are completely machined, hardened and polished, and then the individual longitudinal sections are joined together with the completely finished cams. The finished inside cams are connected to the inside shaft via fastening pins, whereby one fastening pin secures one individual cam and/or one double. One disadvantage here is that radial displacement of the inside shaft with respect to the outside shaft may occur in introduction of the fastening pins, so that the coaxial relationship of the two shaft elements, which is important for the functionality of the camshaft, may be impaired.

EP 1 362 986 A1 describes a multipart camshaft which has at least one inside shaft and one outside shaft, and whereby at least first and second cam elements are provided, the first cam elements being fixedly connected to the inside shaft and the second cam elements being fixedly connected to the outside shaft. Fastening sleeves are provided for fastening the first cam elements to the inside shaft, these fastening sleeves being inserted into a bore that passes through the first cam element, the outside shaft and the inside shaft, and then being pressed together, in particular being widened radially.

The present invention relates to the problem of designing a camshaft of the type defined in the introduction so that no radial displacement can occur between the inside shaft and the outside shaft in particular in a pinned fitting of the first cam elements to the inside shaft.

This problem is solved according to this invention by the subjects of the Independent Claims 1 and 6. Advantageous embodiments are the subject of the dependent claims.

In the case of a camshaft with cams rotatable with respect to one another about the camshaft axis over limited circumferential angles as well as an inside shaft arranged coaxially in the outside shaft, the invention is based on the general idea of implementing a connection between the first cams assigned to the inside shaft via a mutual pinned fitting. Therefore, the first cams each have a first through-bore completely which passes through the first cam and, when the first cam is installed, is aligned with a respective assigned second through-bore in the inside shaft. According to this invention, a fixation device formed from two essentially identical fixation pins is inserted into this bore, which completely passes through the first cam and the inside shaft, whereby each fixation pin is fixedly connected to the first cam via the first through-bore and/or is fixedly connected to the inside shaft via the second through-bore. In the camshaft manufacturing process, the two fixation pins are preferably inserted simultaneously in opposite directions moving toward one another from the outside radially into the first through-bore and pressed toward one another until they first pass through the first through-bore in the first cam and then enter into the second through-bore in the inside shaft. With such a manufacturing process and/or a camshaft manufactured in this way, it is possible to suppress a radial displacement of the inside shaft with respect to the outside shaft, so that the manufacturing quality in particular can be increased.

In a preferred embodiment of the inventive approach, the fixation pins each have a beveled edge at the front in the insertion direction. Such an edge causes a slight sharpening of the fixation pins in the insertion direction, facilitating insertion of same into the respective through-bores. At the same time, due to the beveled edge, the risk of twisting of the fixation pins on the respective through-bores can be reduced, so that handling can be improved and the manufacturing process of joining can be simplified.

Expediently, each fixation pin is fixedly connected to the cam and/or the inside shaft by a press fit, in particular an expansion fit. An expansion fit has the advantage that the fixation pins, which are initially cooled drastically, can be inserted with no problem and with almost no friction into the through-bores and can heat up and expand there, so that a tight pressed fit with the inside shaft and/or with the cam is achieved. It is also conceivable here that in addition, the inside shaft and/or the first cams are heated, so that the second and/or first through-bores widen radially and insertion of the fixation pins is thereby facilitated. Heating of the first cam and/or the inside shaft and cooling of the fixation pins alternately or in combination are conceivable. It is of course also conceivable that neither the inside shaft nor the first cam nor the fixation pins are thermally treated, and the press fit is achieved only by the fact that the fixation pins are each pressed radially from the outside under a high pressure into the first through-bore and then pressed further into the second through-bore. An outside diameter of the fixation pins here corresponds essentially to an inside diameter of the first and second through-bores.

In another preferred embodiment of the inventive approach, two fixation pins come in contact at the ends when the cams are installed. The axis of rotation of the inside shaft and/or the outside shaft is preferably in a plane of contact of the two fixation pins so that the fixation pins that are essentially designed to be identical each penetrate to the same distance through the first and second through-bore, thereby achieving reliable fixation of the first camshaft to the inside shaft.

It is self-evident that the features mentioned above and those to be explained in greater detail below are applicable not only in the particular combination given but also in other combinations or alone without going beyond the scope of the present invention.

Preferred exemplary embodiments of the present invention are depicted in the drawings and explained in greater detail in the following description.

The figures each show schematically

FIG. 1 an inventive camshaft with a fixation device designed as an interconnected pinned fitting, FIG. 2 a diagram like that in FIG. 1 but showing the fixation device installed, FIG. 3 a sectional diagram of a possible embodiment of a fixation pin.

According to FIG. 1, an inventive camshaft 1 has cams 3 and 4 rotatable about the camshaft axis 2 over limited circumferential angles with respect to one another. The camshaft 1 comprises two coaxially arranged shafts, namely one inside shaft 5 and one outside shaft 6, which are mounted to rotate with respect to one another. Between the inside shaft 5 and the outside shaft 6, an annular space 7 is provided, preferably filled with a lubricant, so that the inside shaft 5 is slidingly mounted in the outside shaft 6.

The first cams 3, which are designed here as double cams, are each fixedly connected to the inside shaft 5 via a fixation device 8, while the two cams 4 are fixedly connected to the outside shaft 6. For example, it is possible to provide for intake valves (not shown) of a vehicle engine to be controlled via the first cams 3 and for exhaust valves (not shown) to be controlled via the second cams 4. For rotation of the first cams 3 with respect to the second cams 4, the outside shaft 6 has elongated holes 9 designed in the circumferential direction, in which a fixation pin 10 is adjusted along the fixation device 8 with rotation of the inside shaft 5. To accommodate the fixation device 8 and/or the fixation pins 10, 10', the first cams 3 each have a first through-bore 11 which is aligned with a respective second through-bore 12 in the inside shaft 5 when the first cam 3 is installed. The fixation device 8 is itself formed according to this invention from two fixation pins 10 and 10' with respect to their axial longitudinal extent, each of which is fixedly connected to the first cam 3 via the first through-bore 11 and/or to the inside shaft 5 via the second through-bore 12.

FIG. 1 shows the two fixation pins 10 and 10' such as those that can be inserted through the first through-bore 11 and then through the elongated hole 9 of the outside shaft 6 in fabrication of the camshaft 1, starting from radially on the outside essentially orthogonally to the camshaft axis 2 in the insertion direction 13 and/or 13' and then can be inserted into the second through-bore 12. To facilitate the insertion process during assembly of the first cam 3 on the camshaft 1, the fixation pins 10 and 10' each have a beveled edge 14 on the front as seen in the direction of insertion 13 (see FIG. 3).

In the installed state, as illustrated in FIG. 2, each fixation pin 10 and 10' is fixedly connected to the cam 3 and/or the inside shaft 5 with a press fit, in particular an expansion fit. Such a press fit may be implemented in a wide variety of ways. First, as mentioned previously, an expansion fit may be provided, implemented, for example, by the fact that the fixation device 8 and/or the two fixation pins 10 and 10' are cooled before being inserted into the first through-bore 11 and thereby develop a radial taper. Once they have reached their final position according to FIG. 2, they heat up slowly and expand against an inside lateral surface of the first through-bore 11 and/or the second through-bore 12 to such an extent that the fixation pins 10 and 10' are fixedly pressed to the cams 3 and/or to the inside shaft 5. It is also conceivable here that prior to assembly of the fixation device 8 in the respective first and second through-bores 11 and 12, the cam 3 and/or the inside shaft 5 are heated, and therefore the inside diameter of the first through-bore 11 and/or of the second through-bore 12 is expanded. After insertion of the two fixation pins 10 and 10' into the first through-bore 11 and then into the second through-bore 12, the first cam 3 and/or the inside shaft 5 cools, thereby creating a shrink fit on the two fixation pins 10 and 10'. A combination of heating of the first cam 3 and/or the inside shaft 5 and cooling of the two fixation pins 10 and 10' is naturally also conceivable.

In the completely installed state, such as that illustrated in FIG. 2, the two fixation pins 10 and 10' come in contact at the ends. Then the camshaft axis 2 is situated in a plane of contact of the two fixation pins 10 and 10'.

According to FIG. 3, the fixation pin 10 of the fixation device 8 has an essentially cylindrical shape, whereby an edge 14 provided on the front in the direction of insertion 13 is beveled, as mentioned above, to facilitate insertion into the first through-bore 11 and/or the second through-bore 12. In addition, it is also conceivable that the fixation pin 10 may have an axial longitudinal groove 15, which makes it possible to fabricate the camshaft 1 in a simple pressing operation, i.e., without prior temperature treatment, which makes it possible for the air trapped between the two fixation pins 10 and 10' to be diverted outward during the pressing operation. Such an axial longitudinal groove on the outside lateral surface 16 of the fixation pin 10 also facilitates pressing of the fixation pin 10 into the first through-bore 11 and/or the second through-bore 12 because of its notching effect.

To achieve a high quality of the fabricated camshaft 1, it is important to maintain the coaxial arrangement between the outside shaft 6 and the inside shaft 5 in manufacturing the camshaft 1 and also in subsequent shipping. Especially in the act of producing a pinned fitting, i.e., in the insertion of the fixation pins 10, 10' into the corresponding through-bores 11 and 12 during production, there is the risk the inside shaft 5 might be displaced in the radial direction toward the outside shaft 6 during the insertion process in particular. This can be counteracted by inserting and/or pressing both fixation pins 10 and 10' essentially simultaneously from radially outside through the first through-bore 11 into the second through-bore 12 in the inside shaft 5. In this way, any reactive insertion forces occurring in the direction of insertion of the fixation pins 10, 10' during their insertion are effectively neutralized, i.e., at least largely canceling one another mutually.

LIST OF REFERENCE NUMERALS 1 camshaft
2 camshaft axis
3 first cam
4 second cam
5 inside shaft
6 outside shaft
7 annular space
8 fixation device
9 elongated hole in the outside shaft 6
10,10' fixation pin
11 first through-bore
12 second through-bore
13 direction of insertion of the fixation pins 10
14 beveled edge 15 axial longitudinal groove
16 outside lateral surface

The invention claimed is:

1. A camshaft (1) for automotive engines in particular having cams (3, 4) that can rotate with respect to one another about the camshaft axis (2) over limited circumferential angles, wherein
- an inside shaft (5) and an outside shaft (6) are arranged coaxially one inside the other,
- the mutually rotatable cams (3, 4) consist of a first cam (3) and a second cam (4), of which the first cam (3) is fixedly connected to the inside shaft (5) via a fixation device (8), and a second cam (4) is fixedly connected to the outside shaft (6) via one fixation device for each,
- the inside shaft (5) and the outside shaft (6) are mounted with respect to one another, comprising the features
- the first cams (3) each have a first through-bore (11) which is aligned with the respective second through-bore (12) in the inside shaft (5) when the first cam (3) has been installed,
- the fixation device (8) is formed from two fixation pins (10, 10') that have the same design with respect to its longitudinal extent, each of the pins being fixedly connected to the first cam (3) via the first through-bore (11) and fixedly connected to the inside shaft (5) via the second through-bore (12).

2. The second camshaft according to claim 1, wherein the fixation pins (10, 10') each have a beveled edge (14) in the front as seen in the direction of insertion.

3. The camshaft according to claim 1, wherein each fixation pin (10, 10') is fixedly connected to the cam (3) and/or to the inside shaft (5) via a press fit, in particular an expansion fit.

4. The camshaft according to claim 1, wherein two fixation pins (10, 10') are each in contact at the ends when the cam (3) is installed.

5. The camshaft according to claim 1, wherein the fixation pins (10, 10') each have an axial longitudinal groove (15) that is open toward the outside radially.

6. A method for manufacturing a camshaft (1) for automotive engines in particular having cams (3, 4) that are rotatable with respect to one another about the camshaft axis (2) over limited circumferential angles, wherein
- an inside shaft (5) and an outside shaft (6) are arranged coaxially one inside the other,
- the mutually rotatable cams (3, 4) consist of a first cam (3) and a second cam (4), of which the first cam (3) is fixedly connected to the inside shaft (5) via a fixation device (8) and a second cam (4) is fixedly connected to the outside shaft (6) via one fixation device for each, mounted with respect to one another,
- the first cams (3) each have a first through-bore (11) which, in the installed state of the first cam (3), is aligned with the respective second through-bore (12) in the inside shaft (5),
- the fixation device (8) is formed from two fixation pins (10, 10') that have the same design with respect to its longitudinal extent, each pin being fixedly connected to the first cam (3) via the first through-bore (11) and fixedly connected to the inside shaft (5) via the second through-bore (12),
- whereby the two fixation pins (10, 10') are inserted simultaneously from the outside radially through the first through-bore (11) into the second through-bore (12) in the inside shaft (5), each being inserted.

\* \* \* \* \*